United States Patent
Ionescu et al.

(10) Patent No.: US 7,409,001 B2
(45) Date of Patent: Aug. 5, 2008

(54) METHOD AND APPARATUS USING COORDINATE INTERLEAVING TO INCREASE DIVERSITY IN A MIMO SYSTEM

(75) Inventors: Dumitru Mihai Ionescu, Dallas, TX (US); Steven Gray, Dallas, TX (US)

(73) Assignee: Nokia Corporation, Espoo (FI)

( * ) Notice: Subject to any disclaimer, the term of this patent is extended or adjusted under 35 U.S.C. 154(b) by 895 days.

(21) Appl. No.: 10/918,533

(22) Filed: Aug. 12, 2004

(65) Prior Publication Data

US 2006/0034381 A1    Feb. 16, 2006

(51) Int. Cl.
*H04B 7/02* (2006.01)

(52) U.S. Cl. .................................... 375/267
(58) Field of Classification Search .............. 375/260, 375/267, 299; 455/562.1
See application file for complete search history.

(56) References Cited

U.S. PATENT DOCUMENTS

2004/0002364 A1 * 1/2004 Trikkonen et al. ....... 455/562.1
2004/0243258 A1 * 12/2004 Shattil .......................... 700/73
2006/0203923 A1 * 9/2006 Costa et al. .................. 375/260

FOREIGN PATENT DOCUMENTS

WO    WO 03/075467 A1    9/2003

OTHER PUBLICATIONS

Huang et al., "16-QAM BICM-ID in Fading Channels with Imperfect Channel State Information", Sep. 2003, IEEE Transactions on Wireless Communications, vol. 2, No. 5, pp. 1000-1007.

(Continued)

*Primary Examiner*—Don N Vo
(74) *Attorney, Agent, or Firm*—Harrington & Smith, PC

(57) ABSTRACT

A method to increase diversity in MIMO fading channels interleaves coordinates of complex symbol(s) in a transmission frame after encoding and modulating. Specifically, an input signal is encoded and modulated into a codeword, jointly across at least two pipes, said pipes having space, time, frequency, or other nature, wherein the codeword spans a frame and is defined as at least one complex symbol whose complex values are all those to be transmitted during all channel uses covered by the frame. Each of the complex symbols have a first and second coordinate. After modulating, which may be combined with encoding in a signal space encoder, the coordinates are interleaved. In modulation, the complex symbols (typically two dimensional) may arise as elements of a multidimensional (typically greater than two dimensions) signal constellation, in which case those multi-dimensional constellation coordinates are the ones that are interleaved in the frame. The frame carrying the interleaved coordinates is transmitted by the first and at least second antennas, possible opposed sub-frames of the overall frame being transmitted separately by opposed antennas. A coset selector is used in some embodiments to maximize a minimum Hamming distance, and/or a minimum Euclidean distance, between coordinates within a coset to control diversity and/or coding gain. In some embodiments, the operation of the encoder and modulator is such as to maximize a minimum coordinate-wise Hamming distance, and/or a minimum Euclidean distance, between allowable codewords, and/or to provide additional structure for the allowable codewords. A method, transmitter, system, and mobile station are described.

40 Claims, 5 Drawing Sheets

OTHER PUBLICATIONS

Furió et al., "Rotated TCM Systems with Dual Transmit and Multiple Receive Antennas on Nakagami Fading Channels", Oct. 2002, IEEE Transactions on Communications, vol. 50, No. 10, pp. 1609-1616.

Ariyavisitakul, S.L., "Turbo Space-Time Processing to Improve Wireless Channel Capacity", 2000, IEEE 0-7803-6283-7/00, pp. 1238-1242.

Chindapol et al., "Design, Analysis, and Performance Evaluation for BICM-ID with Square QAM Constellations in Rayleigh Fading Channels", May 2001, IEEE Journal on Selected Areas in Communications, vol. 19, No. 5, pp. 944-957.

Boutros et al., "Signal Space Diversity: A Power- and Bandwidth-Efficient Diversity Technique for the Rayleigh Fading Channel", Jul. 1998, IEEE Transactions on Information Theory, vol. 44, No. 4, pp. 1453-1467.

Bali et al., "Block-Coded PSK Modulation Using Two-Level Group Codes Over Dihedral Groups", Jul. 1998, IEEE Transactions on Information Theory, vol. 44, No. 4, pp. 1620-1631.

Jeličić et al., "Design of Trellis Coded QAM for Flat Fading and A WGN Channels", Feb. 1994, IEEE Transactions on Vehicular Technology, vol. 44, No. 1, pp. 192-201.

Giraud et al., "Constellations Designed for the Rayleigh Fading Channel", ISSI conference (believed to be 1993), 1 page.

Ng, S.X., et al., "Space-Time Block Coded and IQ-Interleaved TCM, TTCM, BICM and BICM-ID Assisted OFDM", 2003 IEEE 58th Publication date Oct. 6-9, 2003 vol. 3, pp. 1492-2496.

Ng, S.X., et al., "Space-Time Block Coded IQ-interleaved Joint Coding and Modulation for AWGN and Rayleigh Fading Channels", 2003 IEEE 57th Semiannual Publication date Apr. 22-25, 2003 vol. 2, pp. 1367-3171.

* cited by examiner

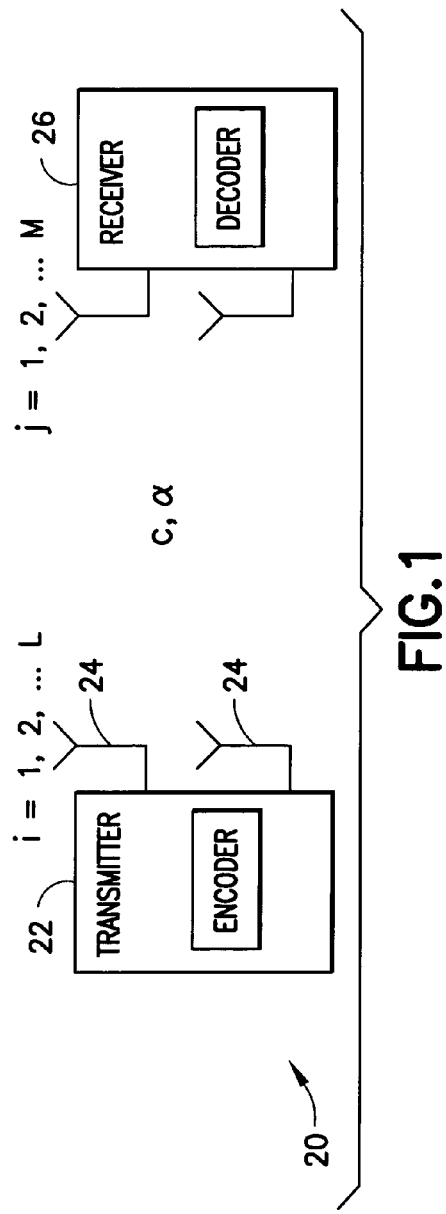

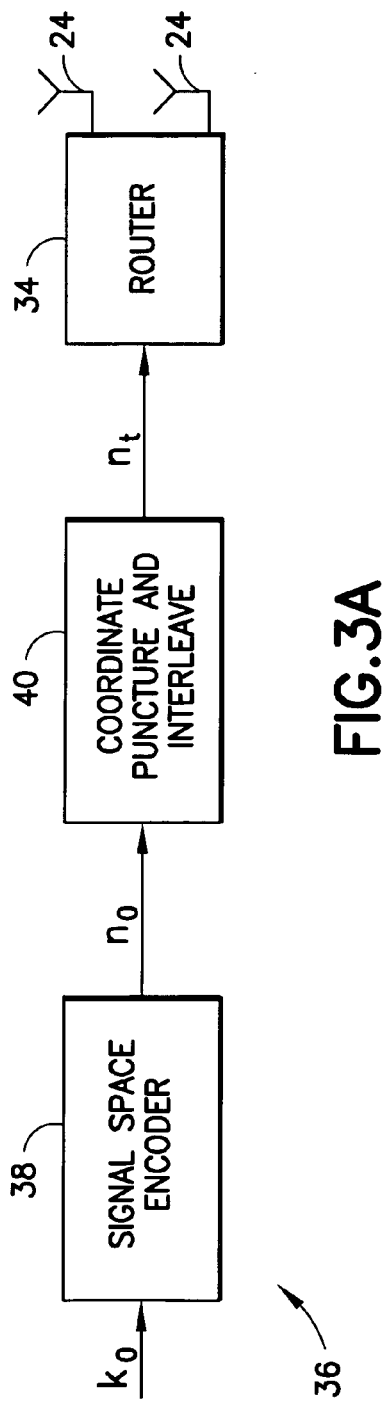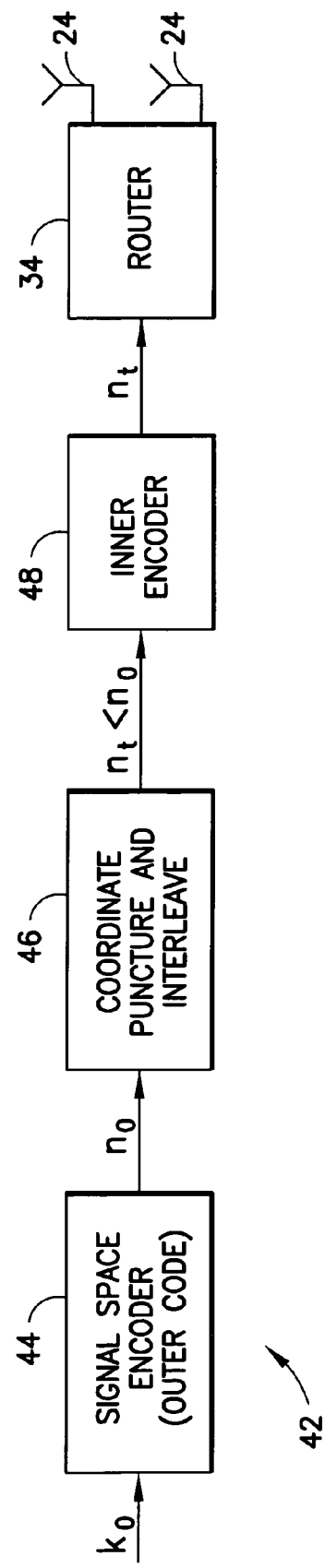

METHOD AND APPARATUS USING COORDINATE INTERLEAVING TO INCREASE DIVERSITY IN A MIMO SYSTEM

FIELD OF THE INVENTION

The present invention relates to enhancing diversity in digital communication systems that employ multiple transmit antennae. It is particularly directed to using multi-dimensional modulation for such systems, without excluding the case where the transmitter has (some) knowledge of the channel parameters.

BACKGROUND

Modulated wireless signals from a transmitter reach a receiver by a number of propagation paths. The characteristics of each propagation path vary over time and between one another subject to factors such as fading, multipath, and different signal to interference and noise ratio (SINR). Multiple transmit and/or receive antennas may be used to provide diversity that insures against adverse effects on any of these paths, because the likelihood of correctly receiving a transmission increases with the number of transmit antennas so long as one propagation path is not merely a (linear) combination of the others. This diversity-oriented approach accommodates both space-time coding and space-frequency coding, as well as a mix thereof (sometimes called space-frequency-time coding), and due to the emphasis on performance over capacity, may include knowledge of channel state at the transmitter. This approach is fully realizable with only one receiver antenna, and additional receiver antennas may be simply used to add receiver diversity gain, or to facilitate capacity improvements.

While multiple receive and/or multiple transmit antennas—giving rise to multiple input multiple output (MIMO) channels—have been successfully employed to enhance diversity, they also allow a substantial increase in communication capacity as compared to non-MIMO systems. Under certain conditions, that increase is linearly related to the number of transmit or receive antennas. The resulting MIMO channel may be considered as a number of independent channels, the number being at most the lesser of the number of transmit and receive antennas. Each of the independent channels is also referred to as a spatial subchannel of the overall MIMO channel, and corresponds to one dimension.

A bit sequence is sent by modulating a signal, according to constellation points, onto either a single carrier wave to assume discrete values of a signal parameter, or a set of subcarriers, in the case of orthogonal frequency division multiplexing (OFDM). While increasing the number of available constellation points allows increased data rates over a given bandwidth, the increase necessarily increases error frequency at the decoder because adjacent constellation points are closer in proximity to one another as compared to a constellation with fewer points. Trellis coded modulation (TCM) is one coding technique wherein modulation and coding are combined in a manner that reduces error rate by restricting transitions between adjacent constellation points, and thereby avoiding bandwidth expansion. Other coding techniques employ block coding, and include low density parity check (LDPC) codes.

In an uncoded system, the minimum distance between adjacent constellation points is merely the Euclidean distance. A fundamental concept of TCM systems is that transitions between adjacent constellation points are not allowed during the process of adding redundancy for the purpose of forward error correction. TCM systems allow transitions only between non-adjacent points, so that the minimum Euclidean distance between points in an allowed transition, is greater than the Euclidean distance between two nearest adjacent points. TCM systems can thus increase coding gain without increasing bandwidth.

Regarding the use of coded modulation in fading channels, conventional use of TCM (alone, or via an outer TCM and a concatenated inner code) have proven unable to achieve a diversity order of more than about three in fast fading environments, and more than about five in space-time bit interleaved coded modulation schemes. What is needed in the art is a method and apparatus to increase or maximize the diversity order in a fast fading environment, especially using multiple transmit antennas, across which coding may be performed simultaneously, or jointly. Prior art solutions using bit interleaved coded modulation schemes dispose an interleaver between an encoder and modulator, which separates coding from modulation, and undermines certain capacity advantages attainable by using multiple transmit antennas.

SUMMARY OF THE INVENTION

The present invention is in one aspect a method for transmitting, with increased diversity in fading channels as compared to prior art methods, an input signal from a plurality of transmit antennas. The method includes jointly encoding, over at least two pipes (pipes including, but not limited to, space, time, frequency, or spreading code) and modulating an input signal into a codeword. The codeword spans a transmission frame and is defined as at least one complex symbol (such as, but not limited to, a symbol of a 4PSK constellation) that describes all of the complex values to be transmitted during all channel uses covered by the frame. Each complex symbol has a first and a second coordinate. The coordinates are interleaved within the frame, and the frame corresponds to a predesignated number of channel uses used by the encoder, such as arising from, but not limited to, a number of transitions through an entire trellis. Further redundancy (for purposes of forward error correction) is not necessarily added thereafter (by additional encoding steps), though it is not precluded by the invention. The method applies whether encoding and modulation occur at once or separately; in the former case, the resulting redundancy scheme is referred to as a signal-space code, or coset code, or lattice code, depending on the extent of the structure designed into the encoder. In connection with complex symbols, the terminology 'first and second coordinates' refers to the in-phase and quadrature components, respectively. Following in the method, the interleaved first and second coordinates in the frame are transmitted from at least two transmit antennas, in general during different uses of the multiple input multiple output (MIMO) channel seen by the encoder/modulator subblock(s). Transmission from multiple transmit antennas can reflect the steps of encoding over multiple transmit antennas, preferably jointly, and/or the step of precoding (over multiple transmit antennas) with the purpose of eigenbeamforming—should the transmitter, in the latter case, have information about the channel state. Thereby, the present invention accommodates any number of transmit antennas greater than one, including the use of some transmit antennas for precoding (beamforming), and is most advantageous when the first and second coordinates of each complex symbol—generated during the operation of the signal-space encoder—are each transmitted during the same or distinct times (channel uses) either from the same or from different transmit antennas. An important aspect of the invention is to insure that the first and second coordinates, when passing through the MIMO channel, experience different degrees of fading (channel magnitudes in a flat fading scenario), in such a way as to benefit from any relevant diversity that may be present in the MIMO channel.

Any particular transmission frame according to the present invention would typically carry coordinates from several complex symbols, the symbols generated by operation of an encoder and modulator—which are possibly combined into a signal-space encoder. Conceptually, the coordinates of each complex symbol generated by the encoder and modulator are separated from one another, leaving twice as many individual coordinates as complex symbols. The separated coordinates are then collected and possibly rearranged whereby consecutive individual coordinates are no longer paired in a manner that necessarily represents the complex symbols generated by the aggregated encoder and modulator. The resulting collection of individual coordinates are interleaved within the frame such as in FIG. 2A, then reassembled into complex values so that any pair of coordinates that is transmitted over a single symbol epoch (e.g., a column of FIG. 2A) from a single transmit antenna is unlikely to represent opposing coordinates of the complex symbol generated by the encoder-modulator aggregate for that particular antenna and symbol epoch. The receiver must de-interleave the individual coordinates in order to re-assemble the complex symbols that were generated by the encoder and modulator aggregate in the transmitter. Because coordinates of any single generated symbol are unlikely to be sent over the same symbol epoch or from the same transmit antenna due to the coordinate interleaving performed at the transmitter, they will experience different channel conditions.

Preferably, when trellis coded modulation is used to realize a signal-space code, the encoding includes partitioning a, possibly multidimensional, signal constellation into a plurality of mutually exclusive cosets, the cosets selected to maximize a minimum Hamming distance between coordinates of points from the same coset, and/or a minimum Euclidean distance between points from the same coset. Preferably, too, a signal space encoder used by this method and apparatus is programmed to operate so as to insure that the labels of various trellis branches, the labels being matrices, are defined so as to obey an equal eigenvalue criterion, while maximizing a minimum coordinate-wise Hamming distance, and/or a minimum Euclidean distance between different codewords. The present invention applies to both unrotated and rotated constellations on the individual transmit antennas; rotation may favor increasing the minimum coordinate-wise Hamming distance, but the invention is not conditioned on rotation per se. For example, with two transmit antennas, a first sub-codeword that is at least one complex symbol from a first constellation may span a first subframe. A second sub-codeword that is at least one complex number from a second constellation may span a second sub-frame. The two (or more) non-overlapping sub-frames make up the transmission frame. The coordinates for the first and second sub-codewords/symbol sets are interleaved, in their respective sub-frames or in the overall transmission frame, then transmitted from the transmit antennas, possibly after puncturing and repetition. Thereafter, each antenna transmits coordinates from symbols that belong to one of the original constellations, or to more than one of the possibly different constellations, or to alternative constellations that resemble none of the original constellations.

In another aspect, the present invention is a method for transmitting an input signal, whereby the input signal is signal-space encoded via a trellis code to output, during each trellis transition, a possibly multidimensional TCM-encoded symbol composed of a set of at least one channel alphabet symbol, e.g. a complex symbol. Such output, in itself, represents one trellis transition. Coordinates of each complex constituent of the set of TCM-encoded multidimensional symbols are next interleaved over time, transmit antennas, or eigenbeams (should beamforming be employed when channel state information is known at the transmitter). The interleaving is within one frame, where one complete frame is realized by a complete path through the trellis, and encompasses a predetermined number of trellis transitions. The method then transmits the frame, which consists of the interleaved coordinates, from different transmit antennas or eigenbeams (should beamforming be used), possibly after an additional transformation such as an Inverse Discrete Fourier Transform (IDFT), in the case when orthogonal frequency division multiplexing (OFDM) is employed. It is also possible to puncture, or repeat, some of the (interleaved) coordinates, in order to control the overall code rate, or equivalently the spectral efficiency. This puncturing or repeating of certain coordinates may be prior to or following coordinate interleaving.

The present invention may also be embodied in a transmitter that uses a coset code, or a lattice code, which are alternative realizations of a signal-space code. Such an embodiment includes, in relevant part, a signal-space encoder, a coordinate interleaver, and at least a first and second transmit antennas. The encoder is for jointly encoding, across at least two pipes (e.g., time, space, frequency, spreading code), an input signal into a set of at least one complex symbols that span a frame, the frame corresponding to a predetermined number of channel uses. Each complex symbol has a first and second coordinate. The modulating operation of the signal space encoder is for adapting the encoding operation to the specific channel alphabet, e.g. 4PSK, and preferably comprises a multidimensional signal constellation wherein each multidimensional symbol is defined by at least two real coordinates (e.g., a complex matrix labeling a trellis branch). The coordinate interleaver has an input coupled to an output of the encoder and the modulator (one output where the encoder and modulator are combined into a signal space encoder). The coordinate interleaver is for interleaving coordinates of the set of complex symbols within the frame. The interleaved coordinates are assembled in a frame, which encompasses in the case of TCM a predetermined number of trellis transitions. The two (or more) transmit antennas have inputs coupled to an output of the coordinate interleaver and together they transmit the frame, which includes the first and second interleaved coordinates, so that the interleaved coordinates are transmitted preferably at different times or channel uses, preferably from different transmit antennas, and possibly after subsequent precoding with the goal of eigenbeamforming.

The transmitter embodiment may also include a coset selector to partition a multidimensional signal constellation into cosets of multidimensional symbols realized from a set of at least one complex symbol; the multidimensional constellation is adequately sized to allow transmission, over multiple transmit antennas, of the symbols generated as a result of an encoding operation, where encoding is preferably performed jointly over multiple antennas. Preferably, this partitioning into cosets is done to control one or more performance parameters, such as diversity (e.g., slope of FEP/SNR curve) by maximizing a minimum Hamming distance with respect to coordinates, a minimum Euclidean distance, or to achieve additional encoding structure, such as obeying an equal eigenvalue criterion as known in the art. See, for example, D. M. Ionescu, *On Space-Time Code Design*, IEEE TRANS. WIRE- LESS COMMUN., pp. 22, January 2003; D. M Ionescu, *New Results on Space-Time Code Design Criteria*, PROC. IEEE WIRELESS COMMUN. AND NETWORKING CONF., New Orleans, La., 1999, pp. 684-687; and H. F. Lu et al., *Remarks on Space-Time Codes Including A New Lower Bound And An Improved Code*, IEEE TRANS. INFORM. THEORY, vol. 49, pp. 2752-2757, October 2003.

The transmitter based on the lattice or coset code further includes a signal space encoder and a modulator that together encode and modulate the input signal into a set of at least one complex symbol, where each complex symbol is a constituent of a multidimensional symbol, which in turn is a member of one of the cosets. The transmitter further has a coordinate interleaver, which has an input coupled to an output of the encoding and modulation block, in order to interleave first and second coordinates of a multitude of complex symbols. The interleaved coordinates are assembled in a frame, which encompasses a predetermined number of trellis transitions. Further, the transmitter includes at least a first and a second antenna, each coupled to at least an output of the coordinate interleaver. Together, the first and additional antennas transmit the frame, which includes the first and second interleaved coordinates, so that the interleaved coordinates are transmitted preferably at different times or channel uses, preferably from different transmit antennas, and possibly after subsequent precoding with the goal of eigenbeamforming. Optionally, concerning the encoding and modulation operation, the inventive transmitter may employ a modulator that may be part of a space-time encoder or separate from a joint encoder, though in either case the output of the modulator, possibly of dimensionality greater that two, is coupled to the input of the coordinate interleaver.

In yet another aspect, the present invention includes a method to increase a performance measure in a fading channel communication environment. This method can include partitioning a possibly multidimensional signal constellation into cosets in such a manner as to achieve additional encoding structure, such as obeying an equal eigenvalue criterion known in the art, or to control one or more meaningful measures of performance in a fading channel. The meaningful measures may be a maximized minimum Hamming distance between coordinates of complex constellation symbols, the magnitude of a negative exponent of a signal-to-noise ratio, a minimum Euclidean distance, or any other measures. This method also includes encoding and modulating an input signal into a set of at least one complex symbol from at least one constellation. Modulation may be employed jointly or separately with an encoding scheme, such as a space-time code or a low density parity check code. Following encoding and modulation, the method interleaves over time, (subcarrier) frequency, transmit antennas, and/or eigenbeams the real and imaginary coordinates of the complex symbols that are to be transmitted. This interleaving is done within a frame; in the case when the encoding is realized via a trellis code, one complete frame encompasses a predetermined number of transitions that pass completely through a trellis diagram. The interleaved real and imaginary coordinates are conveyed to the receiver, after said interleaved coordinates are grouped so as to form new (post coordinate interleaving) complex values to be transmitted over the time-domain or frequency-domain MIMO channel-perhaps after an additional transformation such as IDFT, as the case would be in an OFDM scenario. In the case when the encoder is a trellis code, the actual frame is transmitted over a number of different channel uses equal to the number of transitions covered by a frame multiplied by the number of channel uses covered by a trellis transition-possibly adjusted so as to account for any puncturing and/or repetition, introduced with the goal of controlling the overall code rate or the spectral efficiency.

In yet another aspect, the present invention is a system for communicating over fading channels with high diversity, the system having a transmitter and a receiver. The transmitter has an encoder and a modulator, which together encode and modulate, across at least two pipes (e.g., space, time, frequency, spreading code), an input signal into a set of at least one complex symbols that span a frame that corresponds to a predesignated number of channel uses, each complex symbol having a first and a second coordinate. A coordinate interleaver, having an input coupled to an output of the encoder and the modulator, is for interleaving the coordinates of the set of at least one complex symbol within the frame. The transmit antennas each have an input coupled to an output of the coordinate interleaver for transmitting the frame. In the system, the receiver has at least one receive antenna for receiving the frame over a multi-path channel, a coordinate de-interleaver having an input coupled to an output of the receive antenna for de-interleaving coordinates in the frame, a demodulator for demodulating the received frame, and a decoder for decoding the de-interleaved coordinates. The receiver may also include a copy of the coordinate interleaver used in the transmitter, for the purpose of performing iterations between a demodulator (alternatively called a detector) and a decoder.

In another aspect, the invention is a mobile station having an encoder and a modulator that together encode and modulate, across at least two pipes (e.g., space, time, frequency, spreading code), an input signal into a set of at least one complex symbols that span a frame that corresponds to a predesignated number of channel uses, each complex symbol having a first and a second coordinate. The mobile station also has a coordinate interleaver having an input coupled to an output of the encoder and the modulator for interleaving the coordinates of the set of at least one complex symbol within the frame. The mobile station further has at least a first and a second transmit antenna, each having an input coupled to an output of the coordinate interleaver for transmitting the frame.

These and other features, aspects, and advantages of embodiments of the present invention will become apparent with reference to the following description, and in conjunction with the accompanying drawings. It is to be understood, however, that the drawings are designed solely for the purposes of illustration and not as a definition of the limits of the invention.

BRIEF DESCRIPTION OF THE DRAWINGS

FIG. 1 is a block diagram showing a wireless MIMO communication system in which the present invention operates most advantageously.

FIG. 2A shows a table of real and imaginary coordinates collected post encoding and modulation via a systematic encoder, which are to be subsequently interleaved over ten channel uses (either time domain or frequency domain) and across two transmit antennas.

FIG. 3A is a block diagram showing relevant portions of a transmitter using signal space encoding followed by coordinate interleaving, and employing at least one transmit antenna.

FIG. 3B is similar to FIG. 3A but showing an equivalent representation of the encoder, modulator, and coordinate interleaver as a serial concatenation between an outer code, an interleaver, and an inner code; the inner code has one state and rate one, thereby introducing no redundancy, but simply serving as an auxiliary representation for the purpose of implementing one embodiment of the receiver.

DETAILED DESCRIPTION

Figure 2B:
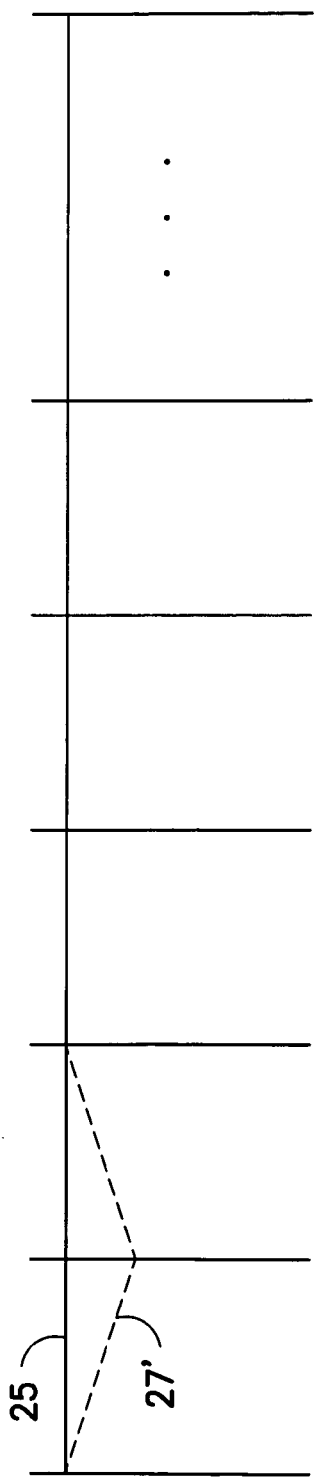
FIG. 2B is a trellis diagram showing two codewords with two transitions differing between them.

The below description relates to space-time code design for linear modulation on frequency nonselective fading channels. The subsequent results apply equally well to systems that employ narrowband modulation and to wideband systems that use multicarrier transmission schemes, where each subcarrier is subject to some form of narrowband modulation. The following description is best understood with reference to the drawings. FIG. 1 is a block diagram representing a communication system 20 wherein a transmitter 22, transmits over more than one transmit antenna 24, each indexed as an ith transmit antenna where i=1, 2, ... L. Beginning at a time instant k, the transmitter 22 sends a series of codewords, of which the present description relates to a single codeword c sent over a series of l symbol epochs or more generally channel uses, the symbol epochs indexed as l=1, 2, ... l. The number of symbol epochs l may also be regarded as the number of adjacent complex symbol epochs processed simultaneously, to some extent, in a detector. The detector is within a receiver 26 that receives the codeword over at least one receive antenna 28, each receive antenna indexed as a jth receive antenna where j=1, 2, ... M. Where fading is uncorrelated across antennas, the total diversity level achieved is M times the diversity of a single receive antenna system. While M=1 will be eventually assumed, the general notation is used below until the closed form for the received signal is obtained. A codeword is the concatenation of all symbols sent over all of the L antennas during the corresponding l consecutive symbol epochs; e.g., a codeword c starting at instant k is $$c = [c_k^{(1)} c_k^{(2)} \ldots c_k^{(L)}, c_{k+1}^{(1)}, \ldots c_{k+1}^{(L)}, c_{k+l-1}^{1}, \ldots c_{k+l-1}^{(L)}]^T = [c_k^T, \ldots c_{k+l-1}^T], \quad (1)$$

where $c_k^i$ is a complex symbol, from the complex signal constellation (with unit average energy, same for all transmit antennas), transmitted at discrete time instant k over transmit antenna i. Alternatively, a more meaningful representation of the codeword c is via the code matrix $$D = \begin{bmatrix} c_k^{(1)} & c_k^{(2)} & \cdots & c_k^{(L)} \\ c_{k+1}^{(1)} & c_{k+1}^{(2)} & \cdots & c_{k+1}^{(L)} \\ \vdots & \vdots & \ddots & \vdots \\ c_{k+l-1}^{(1)} & c_{k+l-1}^{(2)} & \cdots & c_{k+l-1}^{(L)} \end{bmatrix}. \quad (2)$$

Let an arbitrary symbol on any $i^{th}$ transmit antenna be transmitted with energy $E_S$. Also, let the channel attenuation coefficients between transmit antenna i and receive antenna j be $\alpha_{i,j}(\bullet)$, with $E\{|\alpha_{i,j}|^2\}=1$, $\forall i, j$. The codeword c and the channel attenuation coefficients α pertain to FIG. 1. After defining the general setting, j will later be constrained to 1 for this description.

Assuming that each transmitted symbol on any transmit antenna has energy $E_S$, then the energy transmitted by all L transmit antennas 24 in one symbol epoch is $LE_S$. To compare the L-transmit antenna system 20 with a single transmit antenna system where L=1, the transmitted energies per symbol epoch should be the same for both systems. Each transmit antenna 24 should transmit energy $E_S/L$ per constellation symbol, and in the multi-antenna system, $E_S$ would be replaced by $E_{S/L}$.

At time t, the signal received at receive antenna j is $$x^{(j)}(t) = \sum_{i=1}^{L} \alpha_{i,j}(t) s^{(i)}(t) \sqrt{E_s} + \eta^{(j)}(t). \quad (3)$$

The time dependence in equation (3) implicitly assumes that the fading changes from one symbol epoch to another, hence the time dependence. Consistent with notation used in the art, $$s^{(i)}(t) = \sum_{n} c_n^{(i)} u(t - nT)$$

is a succession of pulse shaped symbols $c_n^{(i)}$, $u(\bullet)$ is the unit energy pulse, $u(0)=1$, and $\eta^{(j)}(t)$ is zero mean complex Gaussian noise with variance $N_0/2$ per dimension. For the MIMO system 20, it is assumed that the pulse shape is chosen so as to render intersymbol interference (ISI) negligible, i.e. full response signaling. Symbols are then sampled at the receiver 26 at times t=kT and the detector is presented with $$x_k^{(j)} = \sum_{i=1}^{L} \alpha_{i,j}[k] c_k^{(i)} \sqrt{E_s} + \eta_k^{(j)}.$$

It is sometimes useful to denote $$\gamma_k^{(i,j)} = \sqrt{E_S} \alpha_{i,j}[k], \quad (4)$$

which in the continuum case has the well-known auto-correlation function $E_S J_0(2\pi f_D^{(i,j)} \tau)$; then $$x_k^{(j)} = \sum_{i=1}^{L} c_k^{(i)} \gamma_k^{(i,j)} + \eta_k^{(j)}. \quad (5)$$

Finally, the single receive antenna scenario reduces (5) to $$x_k = \sum_{i=1}^{L} c_k^{(i)} \gamma_k^{(i)} + \eta_k. \quad (6)$$

In the MIMO system 20, a slowly fading channel is not assumed; the focus is on rapid, and in the limit, independent, fading scenarios. Quasistatic fading assumes that the channel attenuation coefficient $\alpha_{i,j}(t)$ is constant over the duration (l complex symbol epochs) of one codeword, but changes from one codeword to another. One design criteria commonly used to influence diversity is termed a "rank criterion". In a Rayleigh flat fading channel, each possible code word difference in coded modulation produces a "difference signal" matrix, which is the codeword difference. An important matrix associated with a matrix A is the Gram matrix of A, defined as the product of $A^H A$ which is clearly a Hermitian matrix (it equals its own conjugated transpose). With this additional notation, the diversity gain between two codewords, provided by multiple transmit antennas in quasistatic fading, is given by the rank of this Gram matrix of the "difference signal" matrix, and the so called coding gain is the effective product measure (distance), which is the geometric mean of the nonzero eigenvalues of the same Gram matrix (product of nonzero eigenvalues raised to power of exponent equal to the reciprocal of the number of nonzero eigenvalues). Increasing the rank and the product measure reduces the pair-wise error probability, and the "rank" has been used as a means to increase diversity. The minimum rank over all codeword pairs determines the diversity for the whole code; similarly for the geometric mean of the non-zero eigenvalues.

But while the rank criterion is relevant in quasistatic fading in the sense of determining the diversity level, in rapid fading the parameter determining diversity was traditionally recognized to be a complex symbol Hamming distance. The Hamming distance is the count of differing positions (sometimes referred to as alphabet letters) in two patterns. Generally, if two ordered lists (e.g., symbols) are compared, the Hamming distance is the number of items that do not identically agree. The differing elements (items, or alphabet letters) can be complex symbols, which was the case in prior art, or coordinates of complex symbols, which is the case in the inventive method and apparatus.

The apparatus and method presented herein describes how to increase diversity by allowing a different (minimum) Hamming distance, between real coordinates of multidimensional trellis branch labels along competing paths through the trellis, to set the diversity level. However, these teachings are not limited only to trellis coding; such is used as a simple example. A Hamming distance criterion may be used to resolve one from among more than two choices as in the above example. Assume the transmitted codeword is e [or $D_e$ in the notation of equation (2)], and the decoder must select between c and e to resolve the received codeword. Therefore, $$D_{ec} = D_e - D_c, \quad (7)$$

is the code difference matrix for codewords e and c.

One important aspect of the present invention is to render meaningful a Hamming distance between coordinates of arbitrary codewords. The present invention uses coordinate interleaving to capitalize on the coordinate-wise Hamming distance by exposing the coordinates in a multidimensional symbol to uncorrelated fades, while transmitting through a MIMO channel; this is discussed in detail below and in reference to FIG. 2. The prior art does include some work in coordinate interleaving for a system that assumes quasistatic fading [see *Rotated TCM Systems with Dual Transmit And Multiple Receive Antennas on Nakagami Fading Channels*, Ignasi Furió and Guillem Femenias, IEEE TRANSACTIONS ON COMMUNICATIONS, Vol. 50, No. 10, October 2002, equations (1) and (2)]. To the inventor's knowledge, this work has been limited to controlling Hamming distance by merely rotating the underlying two-dimensional signal constellation used on the two transmit antennas. This and similar work appears limited also to only two-dimensional signal constellations. While both the present invention and prior art such as that referenced above each seek to control a coordinate-wise Hamming distance, the approaches differ fundamentally. These different approaches result in the present invention differing from those prior art solutions in at least the following aspects: 1) the present invention controls, in a first step, a minimum coordinate-wise Hamming distance between trellis labels (i.e., per trellis transition) by appropriately choosing a coset selector, and in a second step, by ensuring that the encoder operation is such that the successive selection of cosets and points thereof during successive trellis transitions is done in such a way as to achieve the largest minimum coordinate-wise Hamming distance between complete, competing paths through the encoder's trellis—given the constellation(s) in use by various transmit antennas and regardless of whether constellation rotation is allowed or not (should all transmit antennas use the same constellation). Also, 2) the present invention is not limited to using two-dimensional constellations for labeling encoder trellis transitions (encoder trellis branches are labeled with multidimensional constellation points); 3) the present invention does not necessarily modify the channel alphabet, as is the case in the above reference, 4) it does not necessarily alter the constant envelope properties of the original constellation; 5) it does not rely on, or benefit from, the assumption that fading be constant across two consecutive symbols. In addition, 6) the above-mentioned prior art limits the use of the MIMO channel to a mere source of spatial diversity, without adding coding redundancy across time and space; this is obvious from the use of an orthogonal transformation on pairs of interleaved coordinates (spatial encoding only). In contrast, the present invention can and does include space and time encoding (coding redundancy in both time and space), and does not rely on orthogonality (i.e., it does not assume that the complex symbols transmitted are separated at the receiver by an orthogonality property of the symbols).

Note that the orthogonal transformation used by said prior art is an orthogonal space-time block code, which can have full rate, and admits linear decoding, only for two transmit antennas. More importantly, 7) the above prior art simply implements the approach in "B. Jeličić and S. Roy, *Design of Trellis Coded QAM for Flat Fading and AWGN Channels*", IEEE TRANSACTIONS ON VEHICULAR TECHNOLOGY, Vol. 44, pp. 192-201, February 1995, albeit after an additional rotation of the relevant (chosen) constellation. Specifically, the encoder in Furió's approach is a single stream (output) encoder that benefits from Jelicic's embodiment (for a single transmit antenna!), because the use of multiple transmit antennas in the former approach relies on separability of the complex symbols transmitted from all (two) transmit antennas due to the orthogonal transform (essentially, an orthogonal, space-time, block code) at the transmitter. In other words, the encoder in Furió's approach cannot benefit from the presence of multiple transmit antennas while adding redundancy for forward error correction—in the sense that the encoding redundancy associated with the encoding process is separated, and cannot benefit, from the availability of multiple transmit antennas (the latter are simply, and directly, used as a source of diversity for transmitting the coordinates generated by the operation of the TCM encoder). Finally, and more fundamentally, in Furió's method rotation is 1) essential to raising the coordinate wise Hamming distance, and thereby further benefiting from coordinate interleaving, and 2) constitutes the only differentiator from Jeličić's method—which could, otherwise, be extended to a MIMO channel in an obvious way, by directly cascading Jeličić's method with an orthogonal space time block code (which can be done even without the rotation element added by Furió's method).

FIG. 2A is a table of one codeword c transmitted over two antennas 24. For illustrative purposes, the figure suggests that the codeword may have a systematic part and a parity check part, as represented by the subscripts (x) and (y), respectively. Each column of FIG. 2A represents one symbol epoch or channel use. Whereas there typically are a much greater number of symbol epochs per codeword (e.g., 1920) in practice, ten are shown for illustration purposes. FIG. 2A represents a codeword transmitted from two antennae 24, indicated by the superscript (1) or (2). Each row of FIG. 2A represents an in-phase I (the real part) or a quadrature phase Q (the imaginary part) of that codeword as transmitted from the $i^{th}$ transmit antenna 24. Assuming for this example that the encoder is a trellis encoder, after l=10 symbol epochs, or one frame, the encoder begins again for the next codeword. The subscript (x) or (y) indicates whether the cell entry of FIG. 2A is associated with the systematic or the parity check component of the transmitted codeword; the first five epochs carry the x component and the last five epochs carry the y component. The natural order of filling up the table follows the order in which the respective coordinates (systematic and parity check) are produced by successive trellis transitions during the operation of the encoder and modulator.

FIG. 2A represents all the real coordinates that must be sent by the antennas during the transmission of a single codeword. If the encoder is actuated l times during a single codeword, and each time the encoder is triggered with k bits, then there will be $2^{lk}$ codewords in the codebook. Note that the coordinates themselves are interleaved, rather than the bits that make up (or are mapped to) coordinates.

Consider FIG. 2B, a trellis diagram showing paths of two codewords through the trellis. A first codeword 25 remains in state zero for all transitions from stage A to stage B, B to C, C to D, etc. through the entire frame. One complete path through the trellis spans a frame. The path of the second codeword 27 differs from the first only at stage B, and therefore only during its transitions from stage A to stage B and from stage B to stage C. Each transition between two stages (sometimes called instants), e.g., A, B, corresponds to one or more channel uses, depending upon how many channel uses are necessary to send a multidimensional constellation point that labels a trellis branch; note that columns of FIG. 2A each represent one use of a MIMO channel, as one column holds as many coordinates as can be transmitted from the available transmit antennas during one use of the MIMO channel. The 2×2 matrices of FIG. 2C each represent that portion of the respective codeword in FIG. 2B that corresponds to the first trellis transition, each defining the non-binary symbols generated by the encoder-modulator aggregate for two transmit antennas and two symbol epochs. The elements of each 2×2 matrix are from a quaternary alphabet, which could be a 4PSK alphabet. For example, four complex symbols in a classic 4PSK alphabet may be denoted 0, 1, 2 and 3; with respective symbols 0 through 3 being $$\frac{(1+j)}{\sqrt{2}}, \frac{(-1+j)}{\sqrt{2}}, \frac{(1-j)}{\sqrt{2}}, \text{ and } \frac{(-1-j)}{\sqrt{2}}, \text{ where } j = \sqrt{-1}.$$

Figure 2C:
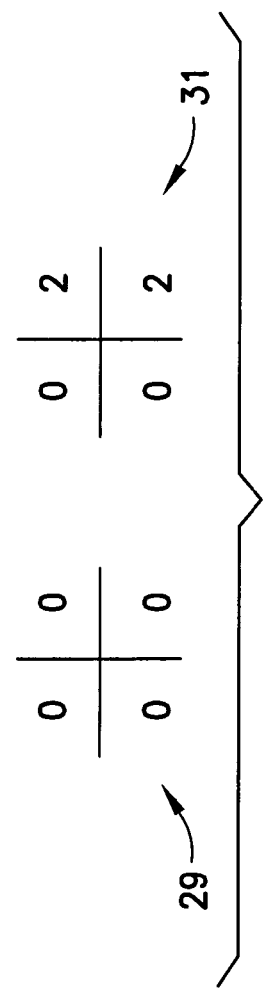
FIG. 2C is a pair of 2×2 matrices that represent, each, the portion of the respective codewords of FIG. 2B that correspond to the first trellis transition, for two transmit antennas.

Assuming two transmit antennas, each transition is represented by a 2×2 matrix such as those in FIG. 2C, where each row represents an antenna and each column represents a channel use. The A to B transition is labeled by the first matrix 29 for the first codeword 25; and by the second matrix 31 for the second codeword 27. As the matrices 29, 31 are formed of complex symbols each with a real and imaginary component, there are actually eight coordinates underlying the four symbols depicted in each 2×2 matrix 29, 31; the codewords 25, 27 could be separated by components as in FIG. 2A. The codewords 25, 27 exhibit a symbol-wise Hamming distance of at least two, as indicated by the matrices in FIG. 2C, assuming no other non-zero Hamming distance is contributed by the remaining paths through the trellis along the first 25 and second 27 codewords. However, the present invention does not involve symbol-wise Hamming distance.

The present inventive method and apparatus relate to the Hamming distance between coordinates of the two codewords 25, 27 along their complete paths through the trellis. For the example of FIGS. 2B-2C, a non-zero Hamming distance exists only at the A-B and B-C transitions. For the first 25 and second 27 codewords then, the coordinate-wise Hamming distance are observed and optimized during encoder design (trellis-transitions-wise accumulation, and summation along one complete path). A codebook is built by assembling codewords or symbols in this way, so as to achieve a maximized minimum coordinate-wise Hamming distance, and consequently, to yield fewer detection errors at the receiver.

For a frame covering a predetermined number of, for example, 500 transitions, each codeword sent over two transmit antennas is represented by a 2×1000 matrix, which is merely an accumulation of the 2×2 matrices such as one of FIG. 2C that represent one trellis transition (each column being a channel use). These 1000 channel uses constitute a path through the trellis, and one transmission frame. In the present invention, the real and imaginary coordinates for the 2×1000 matrix (which yields a 4×1000 matrix if parsed as coordinates rather than symbols) is mixed or interleaved within that frame. The end result is that any pairing of interleaved coordinates no longer necessarily represents a codeword/symbol of the codebook/constellation; the individual coordinates are preferably spread from their mate among different channel uses.

This leads to the concept of equal eigenvalues. Consistent with the nomenclature of equation (7), assume two codewords e and c, each represented by a 2×1000 matrix that corresponds to 500 transitions through a trellis (each matrix entry being a complex number). When the pairwise difference matrix between e and c, namely, $D_{ec}$, is multiplied by its own Hermitian transpose $D_{ec}^H$, the result is a 2×2 matrix whose eigenvalues characterize the symbol pair e and c. Ideally, the constellation is designed such that, for all possible codeword pairs, the eigenvalues are equal. Practically, the majority of errors in decoding are avoided by ensuring that at least those codeword pairs corresponding to the shortest error events (the dominant error events or those pairs of codewords having the closest paths through the entire trellis) obey the equal eigenvalues criterion. Once the equal eigenvalue criterion is verified (at least for the shortest error paths through the trellis), e and c are further characterized by a non-zero Euclidean distance between them that is to be maximized. In addition to maximizing the Euclidean distance, the coordinate-wise Hamming distance is to be maximized.

The following paragraphs illustrate the benefits of performing coordinate interleaving, while using the available transmit antennas to improve redundancy—in both space and time—for purposes of forward error correction. Consider the scenario where the number of transmit 24 and, respectively, receive 28 antennas are L and M. Conditioned on knowledge of the channel state information (CSI) at the receiver, the probability of the transmitter 22 transmitting $$e = [e_0^{(1)} e_0^{(2)} \ldots e_0^{(L)} e_1^{(1)} \ldots e_1^{(L)} \ldots e_{l-1}^{(1)} \ldots e_{l-1}^{(L)}]^T$$

and the receiver 26 deciding in favor of $$c = [c_0^{(1)} c_0^{(2)} \ldots c_0^{(L)} c_1^{(1)} \ldots c_1^{(L)} \ldots c_{l-1}^{(1)} \ldots c_{l-1}^{(L)}]^T$$

at a maximum likelihood decoder is bounded as below, wherein Pr{•} represents probability and d represents the Hamming distance:

$$Pr\{c \mapsto e \mid \alpha_{i,j}[k], i = 1, \ldots L; j = 1, \ldots M; k = 0, \ldots l-1\} \leq \quad (8)$$
$$\exp\left(-d_E^2(e,c)\frac{E_s}{4N_0}\right).$$

In equation (8), the key parameter is:

$$d_E^2(e, c) = \sum_{j=1}^{M} \sum_{k=0}^{l-1} \left| \sum_{i=1}^{L} \alpha_{i,j}[k](c_k^{(i)} - e_k^{(i)}) \right|^2. \quad (9)$$

It is known that $$d_E^2(e, c) = \sum_{j=1}^{M} \sum_{k=0}^{l-1} \Omega_j[k] C[k] \Omega_j^H[k], \quad (10)$$

where superscript "H" represents conjugated transposition, $$\Omega_j[k] = [\alpha_{1,j}[k], \ldots, \alpha_{L,j}[k]], \quad (11)$$

$$C[k] = \quad (5)$$
$$(c_k - e_k)(c_k - e_k)^\perp = \begin{bmatrix} c_k^{(1)} - e_k^{(1)} \\ c_k^{(2)} - e_k^{(2)} \\ \vdots \\ c_k^{(L)} - e_k^{(L)} \end{bmatrix} [(c_k^{(1)} - e_k^{(1)})^*, \ldots, (c_k^{(L)} - e_k^{(L)})^*],$$

where superscript * indicates complex conjugation and $\alpha_{i,j}$ represent channel coefficients.

Since C[k] is Hermitian (its conjugate transpose matrix equals itself), it admits the singular value decomposition (SVD)

$$C[k] = V[k]D[k]V^H[k] \quad (13)$$

where the superscript 'H' indicates a Hermitian operation (complex conjugated transposition). The term $D_{ii}[k]$, $1 \leq i \leq L$, indicates the diagonal elements of D[k], which is diagonal per SVD transform; L is the number of transmit antennas. The vector $\Omega_j[k]$ of relevant channel coefficients (to receive antenna j) is transformed by virtue of the SVD into $$[\beta_{1,j}[k], \ldots, \beta_{L,j}[k]] = \Omega_j[k]V[k]. \quad (14)$$

The channel coefficients $\beta_{i,j}[k]$ describe an equivalent (fictitious, auxiliary) channel for purposes of the abbreviated mathematical proof shown herein. Because V[k] (arising from the SVD of C[k] in equation 13) is unitary, the independent complex Gaussian random variables $\alpha_{1,j}[k], \ldots, \alpha_{L,j}[k]$ are transformed into a new set of L independent and identically distributed random variables. In other words, there exists an equivalent set of channels $\beta_{1,j}[k], \ldots, \beta_{L,j}[k]$ that characterizes the transmission. Therefore, for each channel use k, and each receive antenna j, $$\Omega_j[k]C[k]\Omega_j^\perp[k] = \sum_{i=1}^{L} |\beta_{i,j}[k]|^2 D_{ii}[k]. \quad (15)$$

By definition, C[k] has rank 1 (that is, if the set $c_k^{(1)}$, $c_k^{(2)}, \ldots, c_k^{(L)}$ is different from $e_k^{(1)}, e_k^{(2)}, \ldots, e_k^{(L)}$) thereby, exactly one value among $D_{1,1}[k] \ldots D_{L,L}[k]$, be it $D_{i_0 i_0}[k]$, is nonzero. The nonzero value must necessarily equal the trace of C[k], which in turn equals:

$$TrC[k] = \sum_{i=1}^{L} |c_k^{(i)} - e_k^{(i)}|^2 = \|c_k - e_k\|^2. \quad (16)$$

Consequently, the key parameter $d^2(c, e)$ reduces to $$\Omega_j[k]C[k]\Omega_j^\perp[k] = |\beta_{i_0,j}[k]|^2 D_{i_0 i_0}[k] = |\beta_{i_0,j}[k]|^2 \sum_{i=1}^{L} |c_k^{(i)} - e_k^{(i)}|^2. \quad (17)$$

The above shows that there exists an equivalent set of independent complex Gaussian channels derived from the original set of independent complex Gaussian channels, and exactly one of them $\beta_{i_0 j}$ affects all of the coordinates transmitted during channel use k. This means that, if the nonzero equivalent channel $\beta_{i_0 j}[k]$ fades, it will affect all 2L coordinates transmitted during the kth channel use. In the context of the present invention, the inventors propose that the essence of coordinate interleaving is as follows:

Theorem: There exists an equivalent set of independent complex Gaussian channels derived from $\alpha_{1,j}[k], \ldots, \alpha_{L,j}[k]$, such that exactly one of them affects all (real/imaginary) coordinates of a transmitted multidimensional point, $(c_k^{(1)}, \ldots, c_k^{(L)}) \in \Re^{2L}$, via $$\Omega_j[t]C[t]\Omega_j^\perp[t] = |\beta_{i_0,j}(t)|^2 \sum_{i=1}^{L} \left[ (c_{t,I}^{(i)} - e_{t,I}^{(i)})^2 + (c_{t,Q}^{(i)} - e_{t,Q}^{(i)})^2 \right].$$

Taking the rightmost portion of the theorem equation immediately above, it is clear that the magnitude squared of the difference, between two possible codewords c and e that will be sent through all antennas at channel use t, can be adversely affected by the squared magnitude of the relevant (equivalent) channel $\beta_{i_0 j}[t]$ itself. (The magnitude of $\beta_{i_0 j}$ is a real number that represents channel fade, and could be very small). At the receiver, in the presence of fading, this translates into the possibility that the decoder may not properly resolve between two potential constellation points, even where the constellation points are well separated in the absence of fading.

The inventors have determined that coordinate interleaving effectively de-couples the magnitude squared of the difference between two possible codewords (the summed portion in the Theorem equation) from the adverse effects of the channel (the magnitude squared multiplier in that equation). Returning to FIG. 2A, each column is associated with a channel use t during transmission, and is thereby exposed to a certain channel magnitude. By scrambling the coordinates via coordinate interleaving, each coordinate goes through the channel at a different channel use t, so a $\beta_{i_0j}[t]$ that is very small during one channel use will affect a set of coordinates (four in FIG. 2A) that, after descrambling, are not all placed in the same transmission column, or in other words do not all belong to the same transition in the trellis. Consequently, even if some coordinates from a certain section (transition) through the trellis are demodulated less reliably at the receiver, chances are that some of the other demodulated coordinates that occur during that transition will have been exposed to less severe fading, and better assist the decoding (recovery) of that transition's label. The Theorem equation does not represent the embodiment of the invention, but is presented to prove the inventors' concept.

The inventors' Theorem above lead them to surmise that, when using multiple transmit antennas and coded modulation possibly over nonbinary fields, with or without puncturing, diversity is increased by the following:

Interleave the coordinates of transmitted multidimensional constellation points in order to enable, and render meaningful, a Hamming distance with respect to coordinates, rather than with respect to complex symbols; and, Find codes for multiple transmit antennas that can maximize the minimum coordinate-wise (as opposed to complex-symbol-wise per current state of the art) Hamming distance between codewords.

The first bullet, coordinate interleaving, is detailed above. The second is resolved, in a first step, by a coset selector that operates to maximize the minimum coordinate-wise Hamming distance between symbols within each coset. Coset selectors operating on a symbol-wise Hamming criterion are known in the art and are commercially available, typically embodied as a computer program on a medium that informs the encoder how to partition constellation points into cosets. In general, cosets are mutually exclusive subgroups that together include every member of a parent group (e.g., the entire symbol constellation). Clearly, interleaving coordinates, as opposed to the bits that make up the coordinates, does not affect the Hamming distance spectrum in the codebook used by the encoder and decoder. In a second step, the second bullet above is observed when the overall encoder operation is such that the successive selection of cosets and points thereof during successive trellis transitions is done in such a way as to achieve the largest minimum coordinate wise Hamming distance between competing paths through the encoder's trellis—given the constellations in use by the multiple transmit antennas, and regardless of whether constellation rotation is allowed or not (should all transmit antennas use the same constellation).

Note that, in general, coordinate interleaving is different from bit interleaved coded modulation, and does NOT preclude (or destroy) the concept of coded modulation (via signal-space coding). This is so because coordinate interleaving operates on the real coordinates of the complex values from the complex modulator alphabet, rather than operating on the coded bits prior to the modulator. The coordinate interleaver of the present invention operates on the real coordinates of the complex symbols that are to be transmitted; that is, after the end result of encoding and modulation.

In an exemplary implementation the space-time signal space code with and without coordinate interleaving can be represented as in FIGS. 3A and 3B. A signal space encoder (or signal space code) is an encoder whose encoded output uses the symbols from a channel alphabet (i.e., complex values in wireless channels) rather than some intermediate finite alphabet (e.g., coded bits) that would be subsequently mapped to channel alphabet 'letters'. In a signal space code, the redundancy step and modulation step are combined by virtue of the code's construction. There is no way of inserting an interleaver between the encoding step (redundancy) and the modulation step. This means that, in general, one cannot implement bit interleaved coded modulation with a signal space code. As is known in the art for a transmitter, a number $k_0$ of unencoded bits (per trellis transition) are input into a constituent encoder at a rate of $k_0/n_0$. In this exemplary embodiment, the constituent encoder implements a geometrically uniform, recursive, systematic space-time signal-space code. In the case of a quaternary alphabet on the individual transmit antennas, e.g., 4PSK, the $n_0$ encoded elements (bits) correspond to as many real coordinates in the modulated (complex) sequence. The $n_0$ coordinates are then input to a router for dispersion among the two transmit antennae.

FIG. 3A is a block diagram of relevant portions of a transmitter 36 according to a first embodiment of the invention. A number $k_0$ of unencoded bits (per trellis transition) are input into a signal-space encoder 38 of rate $k_0/n_0$. The signal-space encoder 38 may be a modulator and a separate encoder, or a combined modulator/encoder. It is noted also that the encoder section of the signal-space encoder 38 can be a space-time encoder, in order to take advantage of encoding over more than one antenna, as is the case in the preferred embodiment. The signal-space encoder 38 of FIG. 3A uses a generalized recursive systematic space-time coset code. The output $n_0$ of the signal-space encoder 38 is then a series of encoded and modulated bits. In 4PSK modulation, each encoded bit $n_0$ corresponds, or is mapped, to a single coordinate of a complex symbol. In other modulations, the encoded bits $n_0$ are no longer individually mapped to a coordinate. The output of the encoder 38 is input into a coordinate interleaver 40. Preferably, puncturing or repetition is also used, so the interleaver module 40 both punctures/repeats and interleaves coordinates. At its core, interleaving of coordinates is performed after encoding and modulation, though additional encoding may be performed after interleaving, beyond what is illustrated in FIG. 3B. A router 34 distributes the resultant signal among the two transmit antennae 24.

FIG. 3B is a block diagram of relevant portions of a transmitter 42 according to an alternative view of the transmitter wherein an inner and an outer code are present. As immediately above, $k_0$ bits are input into a signal-space encoder 44 that uses a generalized recursive systematic space-time coset code, which in this embodiment is viewed as an outer code. The output of this encoder 44 is fed in a coordinate interleaver 40, which preferably both punctures/repeats and interleaves coordinates as in FIG. 3A. The output of the trivial encoder 48 passes through a router 34 and is transmitted from the antennae 24. Each of the coordinate interleavers 40, 46 can use quasi-complementary permutation, puncturing, and repetition patterns.

One fundamental benefit of the present invention can be appreciated when viewing the signal-space encoder 38, 44 followed by the coordinate interleaver 40, 46 as a serial concatenation between an outer code (the actual space-time code) and a single-state, unit-rate (degenerated) code 48. The latter uses a subset (e.g., half) of the coordinates output by the outer code during one trellis transition (see FIGS. 3A-3B).

This decouples the (two) channel uses covered by one trellis transition of the outer code, and allows maximum likelihood performance for the overall scheme to be approached via iterations on the serial concatenation shown in FIG. 3B. It is exactly the fact that the degenerated inner code is non-binary that allows it to generate non-zero extrinsic information during iterations.

Figure 4:
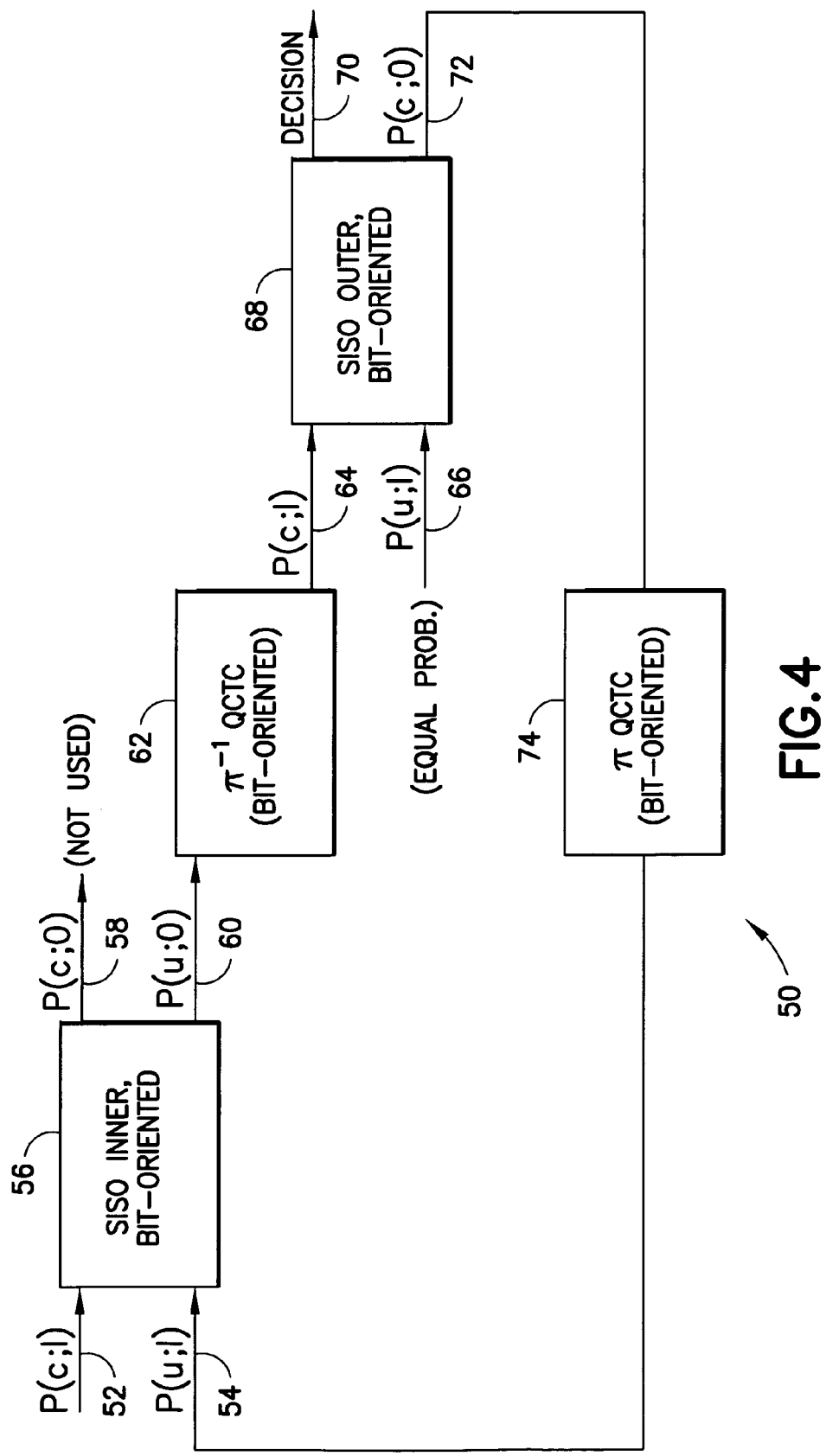
FIG. 4 is a block diagram of an iterative decoder that may be employed in a receiver in order to decode and de-interleave a signal received from a transmitter like that of FIG. 3A.

An exemplary implementation of a receiver having a decoder 50 for a stand-alone signal-space code, in the presence of coordinate interleaving, is shown as FIG. 4. Such a decoder 50 is better explained in conjunction with the transmitter 42 of FIG. 3B. Labels for the various signals input and output between functional blocks follow standard notation, where I and O following the parenthetical semicolon represents input and output, respectively; and c and u preceding the parenthetical semicolon represents a priori extrinsic information on the coded symbols and (uncoded) input bits, respectively. Hereafter, symbols can be substituted by coordinates. The a priori probabilities of the coded symbols, P(c;I), are input 52 from a demodulator (not shown) into an inner SISO decoder block 56 along with a priori probabilities of uncoded information bits P(u;I) 54 from a feedback loop (or from an initialization step). The inner SISO decoder block 56, and all other blocks 62, 68, 74 within this decoder 50 are coordinate-oriented; that is, they operate on elemental entities such as individual symbols or coordinates rather than on groups thereof. The inner SISO decoder block 56 decodes using the inner code (rate one, single state, no redundancy) identified in the equivalent transmission chain (FIG. 3B) and outputs both P(c;O) 58, which is not used, and P(u;O) 60, which is extrinsic information on the input coordinates. The latter output is input into a de-interleave block 62 where it is de-punctured and de-interleaved (consistent with the transmission). The output of the de-interleave block is input P(c;I) 64 into a decode block 68 for the outer encoder in FIG. 3B, which decodes using the (serial constituent) outer code used in encoding (FIG. 3B). The input P(u;I) 66 is in this case driven by equal a priori probabilities for the individual coordinates. Eventually, after multiple iterations, a decision is made as to what codeword was transmitted, at output 70. Feedback provided by the extrinsic probabilities P(c;O) 72 is also input to a re-interleaver 74 which reorders the extrinsic probabilities consistent with the input P(c;I) from the demodulator, and the output of the re-interleaver forms an updated input P(u;I) into the inner decoder block 56. In this manner, the iterative decoder decodes and decides among competing potentially transmitted codewords; the minimum coordinate-wise Hamming distance between codewords in the codebook, which is preserved during the coordinate interleaving/de-interleaving process, and which is maximized at the transmitter by the choice of cosets in the constituent encoder 38, 44, determines a diversity level beyond what is achievable when only a complex symbol wise Hamming distance is maximized.

Figure 5:
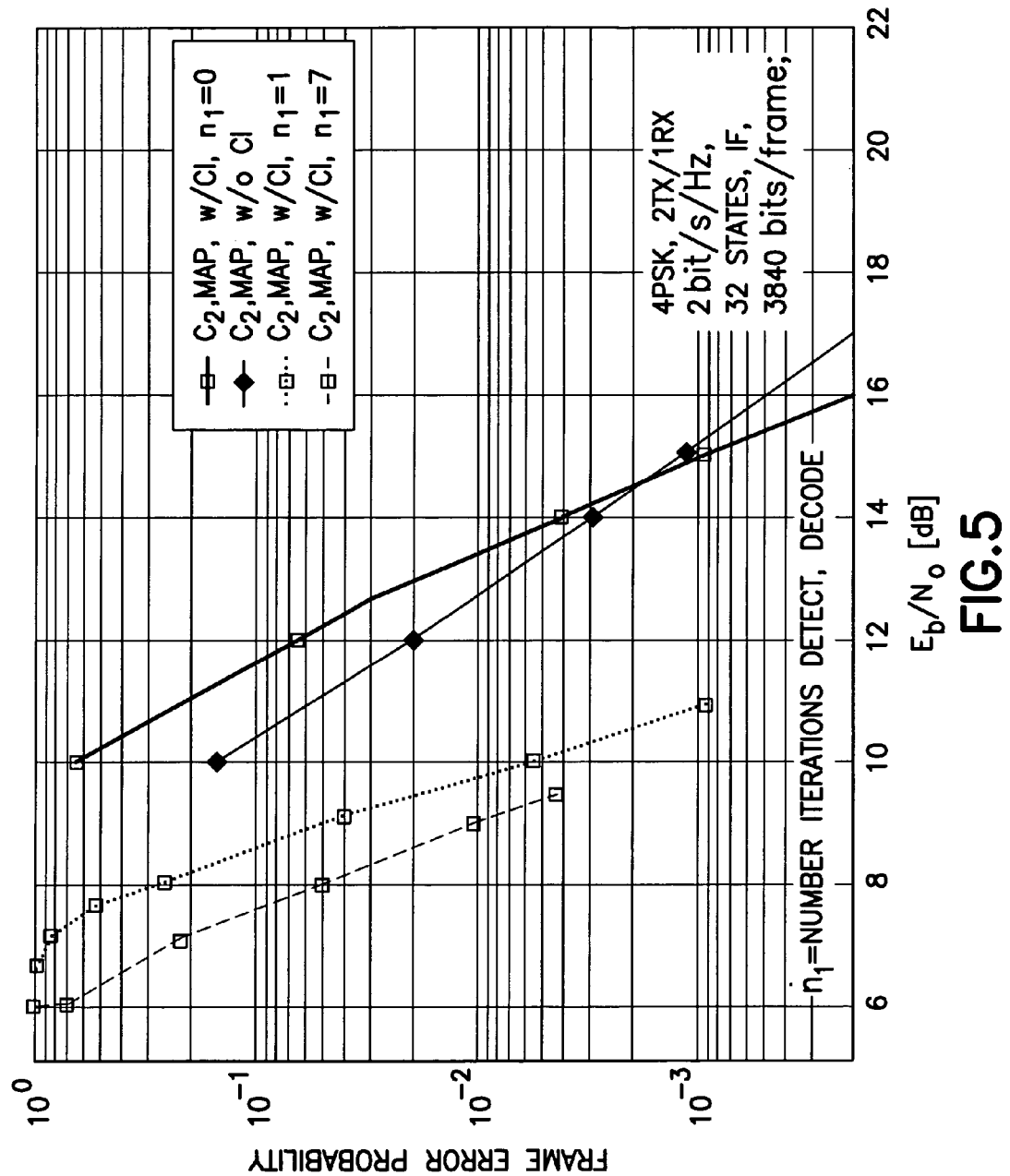
FIG. 5 is a performance graph comparing performance of several embodiments of the present invention.

The effect of increased coordinate-wise Hamming distance (according to the present invention) coupled with increased coding gain derived via iterative detection and decoding ($n_1$ iterations as depicted) is graphed at FIG. 5. The data reflect simulated frame error probability curves for an exemplary implementation of a 32-state code using L=2 transmit antennas and M=1 receive antenna. In the legend, CI represents coordinate interleaving.

To the inventors' knowledge, this reflects a substantial performance improvement (diversity 8) of a space-time code for two transmit antennas, one receive antenna, 4PSK constellations, and with a spectral efficiency of 2 bit/s/Hz, as compared to the art of which the inventors are aware. It also reflects that the present invention outperforms by approx. 1 dB (at FEP=0.01) an exhaustive search optimized code used in a bit interleaved coded modulation scheme with two transmit antennas and diversity 5, as detailed by A. M Tonello in "*Space-Time Bit Interleaved Coded Modulation with an Iterative Decoding Stratey*", PROC. VEHICULAR TECHNOLOGY CONF., September 2000, pp. 473-478.

The performance illustrated in FIG. 5 is directly relevant to OFDM settings, where channel memory in the time domain translates into frequency selectivity and thereby exposes the code to rapid fading when coding is implemented in the frequency domain. The present invention is particularly advantageous when used in a mobile telephone/terminal or base station.

By controlling the minimum coordinate-wise Hamming distance, diversity in a fading environment may be controlled. Coordinate-wise Hamming distance between codewords is controlled, in a first step, by appropriately choosing a coset selector to control a minimum coordinate-wise Hamming distance between trellis labels (i.e., per trellis transition), and, in a second step, by insuring that the encoder operation is such that the successive selection of cosets and points thereof during successive trellis transitions is done in such a way as to achieve the largest minimum coordinate-wise Hamming distance between complete, competing paths through the encoder's trellis—given the constellations in use by various transmit antennas, and regardless of whether constellation rotation is allowed or not (should all transmit antennas use the same constellation). The coordinate wise Hamming distance is preserved for the receiver by interleaving coordinates rather than encoded bits. Diversity of the code is considered the slope of the performance curve of FIG. 5 (logarithmic FEP/signal-to-noise ratio SNR in dB units). Optimum performance in fading channels may be achieved in the encoding, by allocating modulator symbols based on a target performance measure. The target performance measure may be diversity of the code (FEP/SNR), or an exponent of SNR whereby performance decreases as a certain power of SNR (e.g., $SNR^{-N}$). The exemplary TCM embodiment illustrates how to solve the complex problem of maximizing N (of $SNR^{-N}$) for a multi-transmit antenna system by selecting proper coset partitioning along with branch labeling during encoder state transitions, and by using coordinate interleaving, while at the same time adding redundancy in both time and space for the purpose of forward error correction, and regardless of the number of transmit antennas. Rotating the constellation may further help maximize a minimum Hamming distance between coordinates (and between symbols), but is not a requirement.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for transmitting, with increased diversity in fading channels, an input signal from a plurality of transmit antennas, the method comprising:

jointly encoding, across at least two pipes, and modulating an input signal into a codeword, the codeword spanning a frame and defined as at least one complex symbol that describes all complex values to be transmitted during all channel uses covered by the frame, each complex symbol having a first and a second coordinate;

after encoding and modulating, interleaving the coordinates within a transmission frame that corresponds to a predesignated number of channel uses by said encoder; and transmitting the frame of interleaved coordinates by L transmit antennas, wherein L is an integer greater than one.

2. The method of claim 1 wherein the encoding and modulating are performed together.

3. The method of claim 1 wherein the modulating is performed following, and separately from, the encoding.

4. The method of claim 1 wherein modulating comprises employing a signal constellation of symbols that are, in turn, each comprised of at least two real coordinates, such that a minimum Hamming distance between coordinates of symbols is maximized.

5. The method of claim 1 wherein encoding comprises partitioning a signal constellation of symbols into cosets of constellation symbols such that a minimum Hamming distance between coordinates of symbols within a coset is maximized.

6. The method of claim 1 wherein the codeword exhibits a maximized minimum Hamming distance between coordinates of all complex symbols of the codeword, the maximized minimum Hamming distance being relative to any other valid codeword.

7. The method of claim 1 wherein jointly encoding comprises encoding the input signal into at least a first and a second sub-codeword, the first sub-codeword defined as at least one complex symbol from a first signal constellation, and the second sub-codeword defined as at least one complex symbol from at least a second signal constellation, said first and at least second signal constellations not identical to one another.

8. The method of claim 7 wherein interleaving the coordinates comprises interleaving the coordinates of the at least first and second sub-codewords within respective first and second sub-frames that are non-overlapping within the frame.

9. The method of claim 7 wherein interleaving the coordinates comprises interleaving the coordinates of the at least first and second sub-codewords with one another in the frame.

10. The method of claim 7 wherein the second signal constellation comprises the first signal constellation rotated with respect to itself.

11. The method of claim 1 wherein, for a plurality of valid codewords, each defining a codematrix that is an array of complex symbols that would be transmitted from the L antennas during the frame for the respective possible codeword, the method characterized in that a Gram matrix that has all equal nonzero eigenvalues can be identified for at least one code difference matrix that corresponds to the difference between a first and second codematrices that differ during the least number of channel uses in a frame.

12. The method of claim 11 wherein jointly encoding further comprises maximizing a minimum Euclidean distance between valid first and second codematrices that each span one frame.

13. The method of claim 11 wherein jointly encoding comprises maximizing a minimum Euclidean distance with respect to the sequence of complex symbols in a valid codeword, said maximization being carried out relative to any other codeword in the plurality of valid codewords.

14. A transmitter comprising:
an encoder for jointly encoding, across at least two pipes, an input signal into a set of at least one complex symbols that span a frame that corresponds to a predesignated number of channel uses, each complex symbol having a first and a second coordinate;

a modulator for adapting the encoder to a channel alphabet;

a coordinate interleaver, having an input coupled to an output of the encoder and the modulator, for interleaving the coordinates of the set of at least one complex symbol within the frame;

L transmit antennas having inputs coupled to an output of the coordinate interleaver for transmitting the frame, wherein L is an integer greater than one.

15. The transmitter of claim 14 wherein the encoder and modulator together comprise a signal-space encoder.

16. The transmitter of claim 14 wherein the modulator has an input coupled to an output of the encoder.

17. The transmitter of claim 14 wherein the modulator comprises a multidimensional signal constellation, each multidimensional symbol of the constellation comprising at least two real coordinates such that a minimum Hamming distance between coordinates of multidimensional symbols is maximized.

18. The transmitter of claim 14 further comprising a coset selector having an output coupled to an input of the encoder, the coset selector for partitioning a multidimensional signal constellation into cosets of multidimensional symbols such that a minimum Hamming distance between coordinates of multidimensional symbols within a coset is maximized.

19. The transmitter of claim 14 wherein the encoder operates to output sets of complex symbols such that a minimum Hamming distance between coordinates of all complex symbols in any two allowable sets is maximized.

20. The transmitter of claim 14 wherein the encoder encodes the input signal into a first set of at least one complex symbol selected from a first signal constellation, and into a second set of at least one complex symbol selected from a second signal constellation.

21. The transmitter of claim 20 further wherein the coordinate interleaver is for interleaving coordinates of the first set into a first sub-frame and coordinates of the second set into a second sub-frame, the first and second sub-frames comprising non-overlapping portions of the frame.

22. The transmitter of claim 20 further wherein the coordinate interleaver is for interleaving coordinates of the first and second set with one another in the frame.

23. The transmitter of claim 20 wherein the second signal constellation comprises the first signal constellation rotated with respect to itself.

24. The transmitter of claim 14 wherein the set of at least one complex symbol defines a first codematrix that is an array of complex symbols transmitted from the L antennas during the frame, the encoder characterized in that it outputs the set of at least one complex symbol from among a plurality of valid sets, each valid set defining a codematrix, such that a Gram matrix that has all equal nonzero eigenvalues can be identified for a code difference matrix corresponding to the difference between the first and a second codematrices that differ during the least number of channel uses in the frame.

25. The transmitter of claim 24 wherein the encoder operates to maximize a minimum Euclidean distance between valid first and second codematrices that each span one frame.

26. A system for communicating over fading channels with high diversity comprising a transmitter and a receiver, wherein the transmitter comprises:
an encoder for jointly encoding, across at least two pipes, an input signal into a set of at least one complex symbols that span a frame that corresponds to a predesignated number of channel uses, each complex symbol having a first and a second coordinate;

a modulator for adapting the encoder to a channel alphabet;

a coordinate interleaver, having an input coupled to an output of the encoder and the modulator, for interleaving the coordinates of the set of at least one complex symbol within the frame;

L transmit antennas having inputs coupled to an output of the coordinate interleaver for transmitting the frame;

and the receiver comprises:

M receive antennas for receiving the frame over a multi-path channel;

a coordinate de-interleaver having an input coupled to an output of the receive antenna for de-interleaving coordinates in the frame;

a demodulator for demodulating the received frame; and a decoder for decoding the de-interleaved coordinates;

a mechanism for performing one or more iterations between demodulator and decoder;

wherein L is an integer greater than one and M is an integer at least equal to one.

27. The system of claim 26 wherein the encoder and modulator of the transmitter together comprise a signal-space encoder.

28. The system of claim 26 wherein the transmitter further comprises:

a coset selector having an output coupled to an input of the encoder, the coset selector for partitioning a multidimensional signal constellation into cosets of multidimensional symbols such that a minimum Hamming distance between coordinates of multidimensional symbols within a coset is maximized.

29. The system of claim 26 wherein, in the transmitter, the encoder operates to encode the input signal into a first sub-set of at least one complex symbol selected from a first signal constellation, and into a second sub-set of at least one complex symbol selected from a second signal constellation.

30. The system of claim 29 wherein the coordinate interleaver operates to interleave coordinates of the first set into a first sub-frame and coordinates of the second set into a second sub-frame, the first and second sub-frames comprising non-overlapping portions of the frame.

31. The system of claim 30 further wherein the coordinate de-interleaver operates to separate the first sub-frame from the second sub-frame and separately de-interleave coordinates in the separated sub-frames.

32. The system of claim 30 further wherein the coordinate de-interleaver operates to de-interleave coordinates of the first and second set that are interleaved together within the frame.

33. The system of claim 26 wherein the set of at least one complex symbols defines a first codematrix that is an array of complex symbols transmitted during the frame, the encoder characterized in that it outputs the set of at least one complex symbols from among a plurality of valid sets, each set defining a codematrix such that a Gram matrix that has all equal nonzero eigenvalues can be identified for a code difference matrix corresponding to the difference between the first and a second codematrices that differ during the least number of channel uses in the frame.

34. A mobile station comprising:

an encoder for jointly encoding, across at least two pipes, an input signal into a set of at least one complex symbols that span a frame that corresponds to a predesignated number of channel uses, each complex symbol having a first and a second coordinate;

a modulator for adapting an output of the encoder to a channel alphabet;

a coordinate interleaver, having an input coupled to an output of the encoder and the modulator, for interleaving the coordinates of the set of at least one complex symbol within the frame; and L transmit antennas having inputs coupled to an output of the coordinate interleaver for transmitting the frame;

wherein L is an integer greater than one.

35. The mobile station of claim 34 wherein the encoder and modulator of the transmitter together comprise a signal-space encoder.

36. The mobile station of claim 34 further comprising a coset selector having an output coupled to an input of the encoder, the coset selector for partitioning a multidimensional signal constellation into cosets of multidimensional symbols such that a minimum Hamming distance between coordinates of multidimensional symbols within a coset is maximized.

37. The mobile station of claim 34, wherein the encoder operates to encode the input signal into a first set of at least one complex symbol selected from a first signal constellation, and into a second set of at least one complex symbol selected from a second signal constellation.

38. The mobile station of claim 37 wherein the coordinate interleaver operates to interleave coordinates of the first set into a first sub-frame and coordinates of the second set into a second sub-frame, the first and second sub-frames comprising non-overlapping portions of the frame.

39. The mobile station of claim 37 wherein the coordinate interleaver operates to interleave coordinates of the first and second sets together in the frame.

40. The mobile station of claim 34 wherein the set of at least one complex symbol defines a first codematrix that is an array of complex symbols transmitted from the L antennas during the frame, the encoder characterized in that it outputs the set of at least one complex symbol from among a plurality of valid sets, each valid set defining a codematrix, such that a Gram matrix that has all equal nonzero eigenvalues can be identified for a code difference matrix corresponding to the difference between the first and a second codematrices that differ during a least number of channel uses in the frame.

* * * * *